United States Patent
Conroy

(10) Patent No.: US 9,051,127 B2
(45) Date of Patent: Jun. 9, 2015

(54) GRAIN AUGER PROTECTION SYSTEM

(76) Inventor: Scott Conroy, Ortonville, MN (US)

( * ) Notice: Subject to any disclaimer, the term of this patent is extended or adjusted under 35 U.S.C. 154(b) by 679 days.

(21) Appl. No.: 13/438,717

(22) Filed: Apr. 3, 2012

(65) Prior Publication Data

US 2013/0261790 A1 Oct. 3, 2013

(51) Int. Cl.
*B65G 43/02* (2006.01)
*F16P 3/08* (2006.01)
*F16P 3/12* (2006.01)

(52) U.S. Cl.
CPC . *B65G 43/02* (2013.01); *F16P 3/08* (2013.01); *F16P 3/12* (2013.01)

(58) Field of Classification Search
USPC ......... 307/326, 328; 56/10.1, 10.2 R, 10.2 A, 56/10.8, 11.4; 180/271, 274, 279, 280, 180/283; 414/669, 730, 909
See application file for complete search history.

(56) References Cited

U.S. PATENT DOCUMENTS

| | | | | |
|---|---|---|---|---|
| 4,736,097 A | * | 4/1988 | Philipp | 250/221 |
| 4,827,264 A | * | 5/1989 | Bjelk | 342/61 |
| 5,311,961 A | * | 5/1994 | Stabenow | 180/271 |
| 5,453,736 A | * | 9/1995 | Noren | 340/5.6 |
| 6,044,632 A | * | 4/2000 | Schmalz et al. | 56/10.2 R |
| 6,397,569 B1 | * | 6/2002 | Homburg et al. | 56/10.2 F |
| 6,776,569 B1 | * | 8/2004 | McMahon et al. | 414/505 |
| 7,159,684 B2 | * | 1/2007 | Dahl et al. | 180/271 |
| 8,047,757 B1 | * | 11/2011 | Wood | 414/523 |
| 8,328,496 B2 | * | 12/2012 | Cernik | 414/306 |
| 8,666,608 B2 | * | 3/2014 | Friggstad | 701/50 |
| 8,827,782 B2 | * | 9/2014 | Dise et al. | 460/114 |
| 2002/0112913 A1 | * | 8/2002 | Chen et al. | 180/443 |
| 2002/0189220 A1 | * | 12/2002 | Beck | 56/10.8 |
| 2005/0254922 A1 | * | 11/2005 | Berreau et al. | 414/310 |
| 2007/0295590 A1 | * | 12/2007 | Weinberg et al. | 201/17 |
| 2008/0304945 A1 | * | 12/2008 | Hlinka | 414/307 |
| 2009/0261737 A1 | * | 10/2009 | Wright et al. | 315/154 |
| 2010/0274439 A1 | * | 10/2010 | Reeves | 701/33 |
| 2010/0306685 A1 | * | 12/2010 | Giaimo et al. | 715/765 |
| 2011/0304632 A1 | * | 12/2011 | Evertt et al. | 345/474 |
| 2012/0085458 A1 | * | 4/2012 | Wenzel | 141/10 |
| 2012/0099948 A1 | * | 4/2012 | Bump et al. | 414/21 |
| 2012/0229611 A1 | * | 9/2012 | Pellman et al. | 348/49 |
| 2012/0235514 A1 | * | 9/2012 | Astrauskas | 307/326 |
| 2012/0326650 A1 | * | 12/2012 | Ito | 318/473 |
| 2013/0127262 A1 | * | 5/2013 | Roser | 307/326 |

* cited by examiner

*Primary Examiner* — Jared Fureman
*Assistant Examiner* — Carlos Laguerre

(57) ABSTRACT

The present invention is a grain auger protection system that includes an electric motor that generates power to operate the system that is shut-off when movement by a person is detected by the system, a motor cord that is an electrical cord that runs from the motor and a grain bin doorway that receives the motor cord running from the motor that allows a person access to the system. The system also includes a motion detector sensor that includes a circuit controller, a motion detector eye, a controller sensor, a sensor cable, a control circuit and a voltage line that is connected to the motor and terminates the system when movement by the person is detected, a plurality of cords to a controller and a bin sweep auger that is controlled by the system that sweeps a grain bin being protected by the system.

20 Claims, 2 Drawing Sheets

GRAIN AUGER PROTECTION SYSTEM

TECHNICAL FIELD & BACKGROUND

On a farm an auger may be used to remove debris and excess product from large bins. If an individual's clothing were to get caught in the device it could lead to serious injury or even death if the machine is not turned off in time.

The present invention generally relates to a protection system. More specifically, the invention is a grain auger protection system.

It is an object of the invention to provide a grain auger protection system that is a safety system that can be shut down or activated by a motion sensor when sensing a potentially dangerous condition in a grain auger bin.

It is an object of the invention to provide a grain auger protection system that is a safety system that can be shut down or activated by a motion sensor from a relatively generous predetermined distance when sensing a potentially dangerous condition in a grain auger bin.

It is an object of the invention to provide a grain auger protection system that is a safety system that can shut down a piece of machinery or be activated by a motion sensor in a plurality of dangerous environments.

What is really needed is a grain auger protection system that is a safety system that can be shut down or activated by a motion sensor from a relatively generous predetermined distance when sensing a potentially dangerous condition in a grain auger bin that is a safety system that can shut down a piece of machinery or be activated by a motion sensor in a plurality of dangerous environments.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is utilized repeatedly. The phrase generally does not refer to the same embodiment, however, it may. The terms "comprising", "having" and "including" are synonymous, unless the context dictates otherwise.

Figure 1:
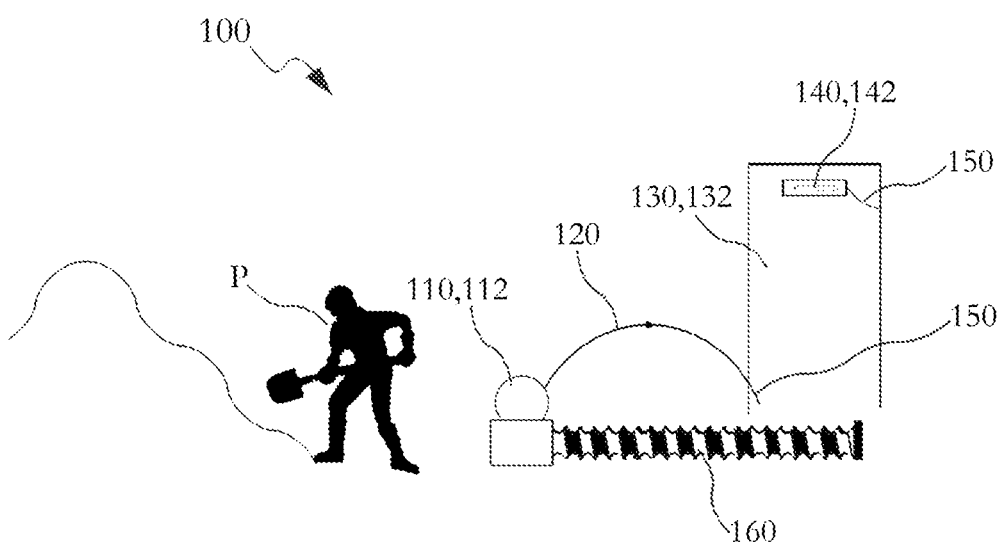
FIG. 1 illustrates an environmental side view of a grain auger protection system, according to an embodiment of the present invention.

FIG. 1 illustrates an environmental side view of a grain auger protection system 100, according to an embodiment of the present invention.

The grain auger protection system 100 includes a motor 110, a motor cord 120, a doorway 130, a motion detector sensor 140, a plurality of cords to a controller 150 and a bin sweep auger 160. The motor 110 can also be a conveyor 112 and is shut-off when movement by a person P is detected by the grain auger protection system 100. The motor 110 generates power to operate the grain auger protection system 100 and is typically an electrical engine although the motor 110 or conveyor 112 can be any suitable type of engine or controller with any suitable voltage. The motor cord 120 is an electrical cord that runs from the motor 110 or conveyor 112. The doorway 130 is typically a grain bin doorway 132 and receives the motor cord 120 running from the motor 110. The doorway 130 allows a person P access to the grain auger protection system 100 and grain bin or other suitable area protected by the grain auger protection system 100. The motion detector sensor 140 includes a motion sensor eye 142 connected to the motor 110 or the conveyer 112 and terminates the grain auger protection system 100 when movement by a person P is detected. The motion detector sensor 140 is set at a predetermined distance up to approximately 50 feet. The controller cords 150 are integral with the motor cord 120 to transmit electrical power within the grain auger protection system 100. The bin sweep auger 160 is controlled by the grain auger protection system 100 that sweeps a bin being protected by grain auger protection system 100. The bin sweep auger 160 can be any suitable size bin sweep auger utilized by the grain auger protection system 100.

Figure 2:
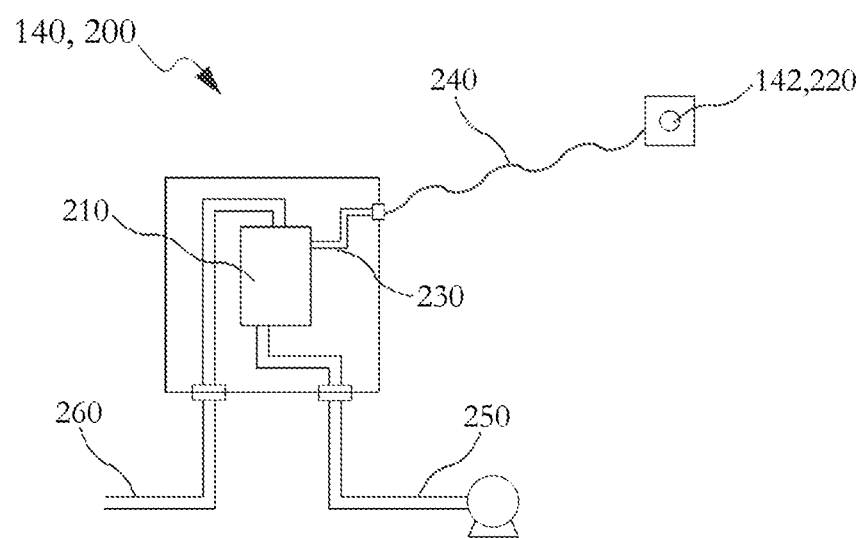
FIG. 2 illustrates a diagram of a motion eye sensor of a grain auger protection system, according to an embodiment of the present invention.

FIG. 2 illustrates a diagram of a motion detector sensor 200 of a grain auger protection system 100, according to an embodiment of the present invention. The motion detector sensor 200 includes a circuit controller 210, a motion detector eye 220, a controller sensor 230, a sensor cable 240 a control circuit 250 and a voltage line 260. The circuit controller 210 controls the electrical components of the motion detector sensor 200. The motion detector eye 220 is integral to the motion detector sensor 200 and is a similar motion detector sensor 140 that includes a motion sensor eye 142 illustrated and described in FIG. 1 and its description. The motion detector eye 220 is set at a predetermined distance up to approximately 50 feet. The controller sensor 230 is in communication with the circuit controller 210 and the motion detector eye 220. The sensor cable 240 is attached to controller sensor 230 and the motion detector eye 220 and provides communication between the circuit controller 210 and the motion detector eye 220. The control circuit 250 is an electrical circuit controlled by the circuit controller 210. The voltage line 260 provides voltage to the circuit controller 210 of the motion detector sensor 200 and the auger protection system 100.

The grain auger protection system can distinguish between the movement of a person and an inanimate object. The grain auger protection system includes a motion sensor eye connected to a motor or a conveyer and powers off when movement by a person is detected. The grain auger protection system is capable of operating from a predetermined distance as far as 50 feet away from a monitored area such as a grain bin. The grain auger protection system is typically mounted in a position most suitable to capture a person's movement which is typically an operator or other suitable person. Farmers are among the many people who may find the grain auger protection system both relatively convenient and easy to use. The grain auger protection system features a sensor to activate and or shut-off an integral piece of machinery when alerted to an operator's movements. The grain auger protection system is also designed to operate according to a specific motion or action.

The auger protection system can control other electrical devices as well. For example, if someone were to want to dim lights in their home in a certain room, by simply pointing their pointer finger in a downward position toward a sensor integral to the auger protection system, the pointer finger could be seen by the sensing eye and be able to dim any one or more lights associated with the auger protection system. Also the auger protection system can make the lights brighter by pointing upwards. Basically the controller of the auger protection system can run a wide variety of electrical and electronic devices. By being able to fit inside a common single gang electrical junction or device box, there is a vast amount of applications for the controller.

The auger protection system will be able to control electrical circuits or motors where people are present and work around them if there was a problem to arise remotely or where no supervision is present. It would also be able to start motors remotely in the same manner that it would stop them, depending on the program utilized by the system application.

The auger protection system is designed to work off of people's behaviors or movements. In the case of a grain bin sweep, in the event someone were to get caught in the auger, that person's erratic movements or behavior would be captured by a camera or sensor mounted at a position overlooking a worker telling the motor control to cut power to the circuit instantly, therefore minimizing damage done to the person or equipment. The auger protection system could work the same way anywhere there are electrical circuits or motor controlled parts and equipment that people are near that, in an emergency, would be able to see the person's actions and stop the motor or equipment. The auger protection system could also work as a motor starter as in a conveyor or pump that needs to be turned on from a wireless remote location. The operator could also have a certain movement programmed in the motion sensing motor controller to start or stop with a person waving their hand, nodding their head, or maybe by a more complex movement the operator would prefer for added security.

The controller could fit in a box sized in accordance with the size of the motor or circuit needed. In the case of a 20 Amp circuit, the controller could fit in as little as an approximate 6 inch wide by 6 inch high by 4 inch deep box. Line voltage would tie into the controller via hard wire, pipe or cord and plug. Line voltage would feed the controller eye or camera, relays, motor starter or any additional auxiliary equipment wanted. The sensing eye would be fed from the controller by a small cord and mounted in a position most able to capture the operator's movements. The electrical load or motor would be fed from the controller box via hard wire, pipe, or cord and plug. The controller eye would tell the starter and relays when to start or stop by deciphering the operator's movements. The auger protection system could solve a farm and factory circuit control, motor control, and conveyor safety problem that has been overlooked or thought to have no other alternatives or solutions in the industries, along with other applications. Along with adding safety in that circuits and motors would be able to be stopped relatively quickly in the event of an emergency, the system would also add the convenience of controlling motors, pumps, any electrical circuits or hydrological device remotely. The system could also have the benefit of only operating on certain movements for added safety or security. The system also differs from basic motion sensors that turn on at the instance there is motion in that my controller can be programmed to operate on a specific motion or action.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

The invention claimed is:

1. A grain auger protection system, comprising:
   a motor that generates power to operate said grain auger protection system that is shut-off when movement by a person is detected by said grain auger protection system;
   a motor cord that is an electrical cord that runs from said motor;
   a doorway that receives said motor cord running from said motor that allows a person access to said grain auger protection system;
   a motion detector sensor that includes a circuit controller, a motion detector eye, a controller sensor, a sensor cable, a control circuit and a voltage line that is connected to said motor and terminates said grain auger protection system when movement by said person is detected by said motion detector eye;
   a plurality of cords to a controller that are integral with said motor cord to transmit electrical power within said grain auger protection system; and
   a bin sweep auger that is controlled by said grain auger protection system that sweeps a grain bin being protected by said grain auger protection system.

2. The grain auger protection system according to claim 1, wherein said motor is an electrical motor.

3. The grain auger protection system according to claim 1, wherein said motor is a conveyor.

4. The grain auger protection system according to claim 1, wherein said doorway is a grain bin doorway.

5. The grain auger protection system according to claim 1, wherein said motion detector sensor is set at a predetermined distance up to approximately 50 feet.

6. The grain auger protection system according to claim 1, wherein said circuit controller controls a plurality of electrical components of said motion detector sensor.

7. The grain auger protection system according to claim 1, wherein said controller sensor is in communication with said circuit controller and said motion detector eye.

8. The grain auger protection system according to claim 7, wherein sensor cable is attached to said controller sensor and said motion detector eye and provides communication between said circuit controller and said motion detector eye.

9. The grain auger protection system according to claim 7, wherein said control circuit is an electrical circuit controlled by said circuit controller.

10. The grain auger protection system according to claim 1, wherein said voltage line provides voltage to said circuit controller of said motion detector sensor and said auger protection system.

11. A grain auger protection system, comprising:
    an electric motor that generates power to operate said grain auger protection system that is shut-off when movement by a person is detected by said grain auger protection system;
    a motor cord that is an electrical cord that runs from said motor;

a grain bin doorway that receives said motor cord running from said motor that allows a person access to said grain auger protection system;

a motion detector sensor that includes a circuit controller, a motion detector eye, a controller sensor, a sensor cable, a control circuit and a voltage line that is connected to said motor and terminates said grain auger protection system when movement by said person is detected by said motion detector eye;

a plurality of cords to a controller that are integral with said motor cord to transmit electrical power within said grain auger protection system; and a bin sweep auger that is controlled by said grain auger protection system that sweeps a grain bin being protected by said grain auger protection system.

12. The grain auger protection system according to claim 11, wherein said motor is an electric conveyor.

13. The grain auger protection system according to claim 11, wherein said motion detector sensor activates and or shuts-off said grain bin when alerted to an operator's movements.

14. The grain auger protection system according to claim 13, wherein said operator has a certain movement programmed in said controller to start or stop said grain auger protection system with said operator waving their hand, raising their finger or nodding their head.

15. The grain auger protection system according to claim 11, wherein said motion detector sensor is set at a predetermined distance up to approximately 50 feet.

16. The grain auger protection system according to claim 11, wherein said circuit controller controls a plurality of electrical components of said motion detector sensor.

17. The grain auger protection system according to claim 11, wherein said controller sensor is in communication with said circuit controller and said motion detector eye.

18. The grain auger protection system according to claim 17, wherein sensor cable is attached to said controller sensor and said motion detector eye and provides communication between said circuit controller and said motion detector eye.

19. The grain auger protection system according to claim 17, wherein said control circuit is an electrical circuit controlled by said circuit controller.

20. The grain auger protection system according to claim 11, wherein said voltage line provides voltage to said circuit controller of said motion detector sensor and said auger protection system.

* * * * *